United States Patent Office 3,647,615
Patented Mar. 7, 1972

3,647,615
ETHYLENE/VINYL CHLORIDE/N-METHYLOL ACRYLAMIDE
William F. Fallwell, Jr., St. Louis, Mo., assignor to Monsanto Company, St. Louis, Mo.
No Drawing. Filed July 16, 1970, Ser. No. 55,613
Int. Cl. B32b 17/04, 21/28
U.S. Cl. 161—170
16 Claims

ABSTRACT OF THE DISCLOSURE

Ethylene/vinyl chloride/N-methylol acrylamide terpolymer useful as bonding agent for nonwoven fibrous products.

---

This invention relates to ethylene/vinyl chloride/N-methylol acrylamide and to nonwoven fibrous products bonded therewith.

The term "E/VCl/NMA terpolymer" as used herein means ethylene/vinyl chloride/N-methylol acrylamide terpolymer.

The term "nonwoven fibrous material" as used herein means a consolidated mass of fibers laid down by mechanical chemical, pneumatic, electrical or vacuum means or otherwise deposited into the desired shape either flat (webs, mats or sheets) or three-dimensional.

The terpolymer of this invention comprises 15 to 70% ethylene, 30 to 85% vinyl chloride and 0.1 to 10% N-methylol acrylamide. Preferably the terpolymer comprises 20 to 40% ethylene, 60 to 80% vinyl chloride and 1.5 to 4% N-methylol acrylamide. The stable E/VCl/NMA terpolymer of this invention generally has a particle size of emulsion interpolymer of about 500 to about 1500 angstroms and a molecular weight from about 25,000 to about 150,000 as measured by intrinsic viscosity or gel permeation chromatography. The terpolymer can be used in the form of a latex or as an organic solution after coagulation with alcohols such as methyl alcohol and ethyl alcohol. The terpolymers are soluble in organic solvents such as dimethyl formamide, tetrahydrofuran and dimethyl acetamide.

The terpolymer of this invention can be prepared by various means well known to the art. The terpolymer can be prepared by first mixing ethylene and vinyl chloride in an aqueous medium in the presence of any suitable anionic or non-ionic emulsifier and any initiator capable of generating free radicals in the chemical mixture at the chosen reaction temperature and pressure. The N-methylol acrylamide, preferably in aqueous solution either alone or mixed with other polar monomers, is added to the polymerizing ethylene and vinyl chloride mixture gradually throughout the reaction. The addition of the N-methylol acrylamide is preferably begun after about 40 to 50 percent of the desired conversion of the ethylene and vinyl chloride has been reached. A shell-core latex in which the polar monomer is concentrated in the outer layers is produced.

The terpolymer of this invention is preferably prepared by a process which comprises mixing ethylene and vinyl chloride monomers in the presence of an alkaline buffered reduction-oxidation (redox) initiator-catalyst system, water, and from about one percent to about 4 percent based upon the polymer product of an anionic emulsifying agent and reacting the mixture at a temperature and pressure and for a time sufficient to cause polymerization between the ethylene and vinyl chloride, and then to introduce N-methylol acrylamide either alone, or mixed with other monomers in minor amounts in an appropriate diluent such as water into the pressurized polymerizing reaction mixture of the ethylene and vinyl chloride. This process is described in detail in U.S. Pat. 3,428,582 and the subject matter thereof is expressly incorporated herein by reference.

The following examples will illustrate this invention. Parts and percent are by weight unless otherwise indicated.

EXAMPLE 1

This example illustrates the preparation of a 76/20/4 ethylene/vinyl chloride/N-methylol acrylamide interpolymer latex.

Reaction vessel initial charge 14 g. $K_2S_2O_3$ (KPS)
14 g. $NaHCO_3$
10 ml. $\begin{cases} Fe(NO_3)_3 \cdot 9H_2O \ (0.2 \ M) \\ \text{tetrasodium ethylenediaminetetraacetate} \\ (Na_4EDTA) \ (0.4 \ M) \end{cases}$
1.5 g. Na lauryl sulfate (SLS)
$H_2O$ to make 1540 ml.
Methyl alcohol—160 ml.
720 g. vinyl chloride (VCl)
575 g. ethylene (E)

The above ingredients are charged to a suitable reaction vessel and heated to 30° C. with stirring to give a reaction pressure of 1800 p.s.i.g. Polymerization is started by adding a 15% sodium formaldehyde sulfoxylate-$NaHSO_2 \cdot CH_2O \cdot 2H_2$(SFS)/1.5 M ammonium hydroxide ($NH_4OH$) solution to the mixture at a rate of 3 ml./hr. at the same time 20 ml./hr. of a 25 percent SLS solution is added during the first hour and the pressure is kept constant by the addition of pure vinyl chloride as required. After one hour, a 40 percent solution of N-methylol acrylamide and a 9.7% Na lauryl sulfate solution are added together at 60 ml./hr. The reaction is stopped after 4.5 hours when 610 g. VCl has been added and the feed streams are turned off. A total of 1330 g. of VCl, 155 ml. of the 40 percent N-methylol acrylamide, 19.4 ml. of the 15 percent SFS/1.5 M $NH_4OH$ solution, and 20 ml. of the 25 percent SLS solution are added. The resulting polymer latex is vented out the bottom of the autoclave. A total of about 3250 g. of the ethylene/vinyl chloride/N-methylol acrylamide polymer latex is obtained containing 48.8 percent total solids, and 1.4 percent sodium lauryl sulfate (based on the weight of the polymer). It has a pH of 8.6 and a molecular weight of 77,000. The composition of the terpolymer is about 76/20/4 ethylene/vinyl chloride/N-methylol acrylamide.

EXAMPLE 2

An aqueous dispersion of ethylene/vinyl chloride/N-methylol acrylamide 76/20/4 terpolymer prepared substantially in accordance with Example 1 and containing about 45 weight percent polymer solids is coagulated by means of isopropanol. The terpolymer is washed with water and dried.

EXAMPLE 3

Terpolymers of the following composition are prepared substantially in accordance with the procedure of Example 1 above.

| Composition | Particle size, A. Average | S.D. | $\bar{M}_w$ | Tg, ° C. |
|---|---|---|---|---|
| E/VCl/NMA | | | | |
| 19.5/78/2.5 | | | | 18.5 |
| 21/75/4 | 981 | ±132 | 58,700 | 11.5 |
| 20/76/4 | 866 | ±108 | 77,000 | 13.5 |
| 21.5/73/5.5 | 1,111 | ±133 | 59,000 | 6.5 |

The bonded nonwoven fibrous products of this invention can be formed of either natural or synthetic fibers or any combination thereof with the selection of the fiber merely depending upon the specific end use intended for the bonded nonwoven fibrous product. Among the fibers that can be used in accordance with this invention are natural fibers, for example, wood, jute, sisal hemp, cotton, cotton linters, silk, mohair, cashmere, asbestos, wool and glass, and synthetic fibers, for example, rayon cellulose esters such as cellulose acetate, polyvinyl choride, polyvinyl acetate, polyacrylonitrile and copolymers thereof, polyethylene, polypropylene and the like, polyesters such as ethylene glycol-terephthalate polymers, and polyamides of the nylon type.

In many applications, the bonded nonwoven fibrous products of this invention are prepared from a plurality of natural fibers, or a plurality of synthetic fibers, or a combination of natural and synthetic fibers. Combinations of wood fiber and cotton fiber can be advantageously employed in end products such as shoe liners and the like. In general, the wood fiber comprises the major amount of the fiber content of such bonded nonwoven fibrous products. Combinations of glass fiber and asbestos fiber are generally employed in insulating applications. Combinations of glass fiber and wood fiber are also useful in certain drapery applications. The weight ratio of glass fiber to cellulosic fiber in such bonded nonwoven fibrous products is usually from 1:10 to about 10:1.

In wearing apparel applications, a combination of wood fibers and nylon fibers or a combination of wood fibers and rayon fibers can be advantageously employed. Combinations of wood fiber and nylon fiber as well as combinations of wood fibers and polyester fiber are also widely employed in various applications where reinforced sheeting is required. In such combinations of natural and synthetic fibers, the weight ratio of natural fiber to synthetic fiber is generally from about 1:20 to about 20:1 and preferably from about 1:1 to about 3:1.

The nonwoven fibrous materials useful in the preparation of the bonded nonwoven fibrous products of this invention can be prepared by any method known to the art. Thus, the nonwoven fibrous material can be made of fibers deposited in a random manner as well as fiber oriented or aligned along a particular axis. Nonwoven fibrous materials in the form of two dimensional webs can be prepared by the following methods. Oriented webs are produced using conventional web-style machines, such as openers, pickers, cards, or garnetts. Cross-laid webs are made in a manner similar to oriented webs, except that the fibers are carefully placed at right angles to the machine direction to improve cross-wise strength.

Random webs are produced in air-lay machines, and the nonwoven fibrous material has equal strength in all directions. In the air-lay method, continuous filaments are fed through a cutter or breaker which discharges the fibers into the discharge side of a blower. Suitable conduits are provided to guide the fibers to a collecting screen or airpervious structure for collecting the fibers in the form desired. The screen may be in the form of an endless traveling belt passing through the lower portion of a tower into the upper portion of which the blown fibers are introduced by the conduit. A suction box may be placed beneath the traveling screen to assist in the deposition of the fibers thereon. Instead of using a traveling flat screen, a stationary formed screen may be used. For example, the screen may take the form of a hat shaped cone, such as that used in the felt hat-making industry. Alternatively it may have any other form which is suitable to produce the desired shape of the bonded nonwoven fibrous product such as a rectangular tray. As is the case with the endless traveling belt, suction may also be applied beneath the stationary screen to assist deposition of the fibers thereon.

Random webs are also produced by the direct spray method from a solution of molten mass of the fiber material. This is the conventional procedure for the formation of glass fibers or mineral wool fibers, as well as those of nylon or thermoplastic materials, adapted to be dissolved in a suitable solvent or to be melted. The solution or melt is directed to nozzles or jet-forming orifices and a high pressure fluid stream, such air, nitrogen or steam, is directed against the stream or streams of filament-forming material to disrupt them and coagulate them as fibers in the vicinity of the orifices. Electrostatic spinning methods can also be employed for this purpose. As in the case of the use of blowers, the disrupted and dispersed fibers can be directed to the top of the settling tower and allowed to settle with the aid of suction devices upon a suitable traveling or stationary screen at the bottom of the tower. This procedure is particularly adapted to the production of fibers of siliceous materials such as glass or mineral wool, as well as to thermoplastic resin fibers.

Wet random webs are formed from a slurry of dispersed fiber on papermaking or modified papermaking machines. Spun-bonded webs are made of randomly oriented continuous filament fibers bonded at the cross-over point. The method includes extrusion of the continuous filament fibers, drawing to orient the fiber, some fiber entanglements by liquids or air, and bonding at the cross-over points.

The bonded nonwoven fibrous products of this invention are generally prepared by a method which comprises consolidating the loose fibers into nonwoven fibrous material having the structural configuration of the desired bonded nonwoven fibrous products, dispersing the E/VCl/NMA interpolymer bonding agent within the nonwoven fibrous material, and heating the impregnated nonwoven fibrous material to a temperature sufficient to coalescence and fuse the interpolymer, and optionally heating to a temperature sufficient to cross-link the interpolymer if a sulfur cross-linking agent is employed.

Another method for the preparation of the bonded nonwoven fibrous products of this invention which is particularly useful when the nonwoven fibrous material is formed by the air-lay method in an air-lay machine comprises contacting the fibers with the E/VCl/NMA terpolymer dispersion or powder as they fall through the settling chamber to their point of deposition. This is advantageously carried out by spraying the E/VCl/NMA interpolymer dispersion or powder into the settling chamber at some intermediate point between the top and the bottom thereof. By spraying the fibers as they descend to the point of collection, it is possible to effect a thorough distribution of the E/VCl/NMA terpolymer bonding agent among the fibers before they are collected into the nonwoven fibrous material. In the production of certain fibrous products wherein a hot molten mass of a polymer such as nylon or a fused siliceous mass or glass is disrupted by jets of heated air or steam, the bonding agent dispersion or powder can be sprayed directly on the fibers while still hot so that immediately after deposition the bonding agent is set and it bonds and interlocks the fibers in proper relationship. Still another method involves adding the E/VCl/NMA to the fibers prior to consolidation as, for example, by adding the E/VCl/NMA to the aqueous fiber slurry in a modified papermaking process.

The E/VCl/NMA bonding agents can be applied to the fibers of the nonwoven fibrous material by any means known in the art. The E/VCl/NMA bonding agents are usually applied to the fibers of the nonwoven fibrous material by application to the surface thereof, or by submersion of the nonwoven fibrous material in a liquid, thickened or foamed dispersion so that the bonding agent penetrates into the interior of the nonwoven fibrous material. Where the nonwoven fibrous material is a two-dimensional fabric in the form of a fleece or web, the E/VCl/NMA bonding agents are usually applied in the form of an aqueous dispersion. In a typical application, the fabric is impregnated with the E/VCl/NMA bonding agent by dipping or immersing the fabric in the dispersion to provide sufficient wet pickup of the bonding agent. The wetted, nonwoven fibrous material in the form of a fleece or web can be passed between a pair of pressure rolls to effect substantially uniform impregnation and also to control the amount of the bonding agent applied.

The impregnated nonwoven fibrous material is dried by conventional means known to the art in order to remove all or a portion of the water and to effect coalescence and fusion of the E/VCl/NMA within the nonwoven fibrous material. The drying temperature and drying time are dependent upon the size, shape and cross-section of the impregnated, nonwoven fibrous material. In general, the drying temperature is controlled so that no appreciable deterioration or degradation of the fibers or the E/VCl/NMA occurs.

When the E/VCl/NMA bonding agents are used in the form of a dispersion, the dispersion generally contains from about 5% to about 90% of the terpolymer by weight. Such dispersions preferably contain from about 10 to about 60% by weight of interpolymer for ease of application by means of dipping, soaking, spraying and the like.

The amount of E/VCl/NMA bonding agent based on the weight of the fiber component of the bonded nonwoven fibrous product can vary widely depending upon the characteristics desired in the final product and the specific end use. The bonded nonwoven fibrous products of this invention generally contain from about 2% to about 200% of interpolymer based on the weight of the fibers. For the production of preforms intended to be converted into shaped articles, it is preferred to employ from about 2% to about 10% of the E/VCl/NMA bonding agent based on the weight of the fibers. In the production of insulation materials, the amount of E/VCl/NMA bonding agent employed generally falls in the lower part of the above range if the bonding agent is applied primarily adjacent to the surface or surfaces of the product or if it is applied in conjunction with other binders.

When the E/VCl/NMA bonding agent is to serve mainly to bond the fibers together to form a bonded nonwoven fibrous product in which the maximum porosity is retained in conjunction with a minimum change of fiber hand and drape characteristics as well as an increase in tensile strength, there is preferably employed from about 10% to about 70% by weight of bonding agent solids based on fiber content. The lower portion of this range generally gives the maximum porosity and provides a minimum change in the fiber hand and drape characteristics although in the higher portion of this range porosity is mainly retained and the fiber hand and drape characteristics are still evident. The bonded nonwoven fibrous products thus obtained are advantageously used for many sanitary purposes, such as table napkins, bibs, tablecloths, sanitary napkin covers, disposable diapers, disposable sheets, and surgical dressings and compresses. When this amount of bonding agent is used there is relatively little or no "window paning," i.e. the interstices between the fibers are left open leaving a highly porous bulky product. If desired, the density of the product can be modified by the application of various amounts of pressure prior to, or in many cases, after the saturated nonwoven fibrous material has been heated for bonding.

Bonded nonwoven fibrous products containing from about 40% to about 150% by weight of E/VCl/NMA bonding agent based on the weight of the fiber generally find use in the garment industry to provide interlining fabrics for coats, dresses, collars, cuffs and the like and to provide outer wearing apparel fabrics, such as blouses, skirts, shirts, dresses and the like. Bonded nonwoven fibrous products containing the bonding agent in this range are also useful as curtain and drapery materials. In addition to the general household and apparel uses mentioned above, the bonded nonwoven fibrous products of this invention in which 10% to 100% by weight of bonding agent based on the weight of the fiber is employed find many light industrial uses as wiping cloths, filters and lining materials for packaging.

Bonded nonwoven fibrous products of the present invention which contain from about 100% to about 200% by weight of the bonding agent based on the weight of the fiber are particularly useful for heavy industrial uses where durability and resistance to wear are desired. Such uses include industrial gaskets, packings, filters and the like.

If desired, the aqueous dispersion of E/VCl/NMA can also contain a wetting agent to assist penetration of the nonwoven fibrous material to which it is applied. The aqueous dispersions can also contain a foaming agent or they can contain a defoamer when the ingredients of the aqueous dispersion have a tendency to give rise to foaming and when such foaming is undesirable. The conventional wetting agents such as the sodium salt of dioctylsuccinic acid can be used and the conventional foaming and defoaming agents can be employed such as sodium soaps including sodium oleate for foaming and octyl alcohol or certain silicone antifoaming agents for defoaming.

In some instances, the properties of the bonded nonwoven fibrous products are greatly enhanced by a heat cure of the interpolymer to effect cross-linking. E/VCl/NMA are "cross-linked" or they can be cross-linked with various sulfur containing compounds as is disclosed in U.S. Pat. No. 3,356,658. The interpolymers are cross-linked by subjecting the bonded nonwoven fibrous product, after the drying operation, or as a final portion of the drying stage itself, to a curing operation as disclosed in U.S. 3,356,658.

The bonded nonwoven fibrous products of this invention are characterized by high tensile strength, good elongation, softness, good hand and flexibility, good drape and resistance to many common solvents and detergents. With these properties, the bonded nonwoven fibrous products of this invention are suitable for use in a wide variety of end applications, many of which have been noted above and including, for example, paperboard, toilet tissues, cleansing tissues, toweling, wrappings for food products, tea bags, wallpaper, mats, napkins, table cloths, heat or sound insulating materials, electrolytic condensers, luggage skin and interiors, glue coated tape stocks, pressure sensitive tape stocks, masking sheets, pennants, banners, labels, book cover stocks, projection screens, gaskets, printing press top cover sheets, waterproof wrapping paper, sandpaper backs, printing tape, drapery headers, draperies, binders, hospital items such as caps, masks, gowns, jackets, scrub pants, capes, shoe covers, wash cloths, pillow cases, wipes, bandages, alcohol preps, surgical dressings, napkins, cubicle curtains, drapes, diapers and sheets, filters for food processing, motors, machines, air systems or liquid systems, electrical insulators, tapes, ribbons, automobile head and arm rests, upholstery, stuffed pillows, fiberfills, sleeping bags, slip covers, bed spreads, blankets, curtains, window shades, carpeting (nonwoven), carpet backing, wearing apparel, clothing insulation, underwear, diapers, interfacing and interliners, (collars and cuffs), inner soles for shoes, automotive door panels, film backings, floor cleaner pads, abrasive pads, artificial leather and chamois, micro polishers for metals and optical lenses, overlays for plastics, battery separators, automotive speakers, polishers, decorations and automotive padding.

The E/VCl/NMA bonding agents have been described as the sole bonding agent for the bonded nonwoven fibrous products of this invention. However, for some applications, the interpolymers can be employed in combination with thermosetting, pre-condensate resins, such as aminoplasts, which are capable of cooperating with the E/VCl/NMA bonding agent to give enhanced properties of launderability and dry cleaning resistance to the bonded nonwoven fibrous products, particularly when they are in the form of fabric material. The preferred aminoplast resins for blending with the E/VCl/NMA are the condensation products or pre-condensates of urea and formaldehyde and ethylene, urea and formaldehyde.

EXAMPLE 4

Preweighed samples of Hollingsworth and Vose nonwoven fabric composite comprising 75 weight percent cellulosic fiber and 25 weight percent nylon fiber are immersed in aqueous dispersions of E/VCl/NMA bonding agents. The aqueous dispersions contain 13.5 weight percent interpolymer solids. The impregnated fabrics are passed through a size press, weighed, dried for about two minutes at a temperature of about 118° C. and weighed. The bonded nonwoven fabrics are subjected to calendering through a single nip for smoothness and tested for hand and drape characteristics, toughness and tensile strength. Hand and drape characteristics are determined qualitatively by touch and results are given on a scale of 1 through 10. Number 1 means very soft and highly flexible. Number 10 means very rough and non-flexible. Tensile strength is determined by TAPPI T404 OS-61 with a table model Instron. Toughness is determined by measuring the area under the stress strain curve. Results and further details are given in the table below where the amount of bonding agent in the bonded nonwoven fabric is given in percent by dry weight based on the weight of the fiber in the nonwoven fabric, tensile strength is given in lb./in. width, toughness is given in inch-pounds and the following abbreviations are used in order to simplify tabular identification of the monomers.

E—Ethylene
VCl—Vinyl chloride
NMA—N-methylol acrylamide

TABLE

| Bonding agent, percent Composition | | | Bonding agent in nonwoven fabric | Hand and drape | Tensile strength | Toughness |
| --- | --- | --- | --- | --- | --- | --- |
| E | VCl | NMA | | | | |
| 19.9 | 79.3 | 0.8 | 35 | 6 | 8.1 | 1.66 |
| 22.15 | 77.2 | 0.65 | 35 | 6 | 9.3 | 2.47 |
| 21.7 | 76.9 | 1.4 | 35 | 5 | 10.2 | 4.08 |

The E/VCl/NMA terpolymers of this invention are also useful as protective coatings for substrates such as wood, metal and glass; as laminating adhesives for safety glass, paper products and the like; as wrapping films and sheeting and as shaped articles such as protective bumper extensions and caps. When used as protective coatings for substrates such as wood, metal and glass the polyblend compositions can be applied in the form of an organic solvent solution or in the form of aqueous dispersions optionally containing pigments and dyes. The terpolymers are also useful as adhesive binders alone or with starch for inorganic pigment compositions used to coat cellulosic substrates as is disclosed and claimed in application S.N. 56,685 filed July 16, 1970 entitled "Composition Comprising Ethylene/Vinyl Chloride/N-methylol Acrylamide and a Mineral Pigment for Coating Paper" filed in the name of William F. Fallwell and assigned to the assignee of the present invention.

The embodiments of this invention in which a particular property of privilege is claimed are defined as follows:

1. Bonded nonwoven fibrous product comprising nonwoven fibrous material bonded with an ethylene/vinyl chloride/N-methylol acrylamide terpolymer.

2. Product of claim 1 wherein the terpolymer contains from about 15 to about 70 weight percent ethylene, from about 30 to about 85 weight percent vinyl chloride and from about 0.1 to about 10 weight percent N-methylol acrylamide.

3. Product of claim 1 wherein the nonwoven fibrous material is made of natural fiber.

4. Product of claim 3 wherein the fiber is cellulosic fiber or glass fiber.

5. Product of claim 1 wherein the nonwoven fibrous material is made of synthetic fiber.

6. Product of claim 5 wherein the fiber is polyester fiber or polyamide fiber.

7. Product of claim 1 wherein the nonwoven fibrous material is a combination of natural fiber and synthetic fiber.

8. Product of claim 1 wherein the nonwoven fibrous material is in the form of a two dimensional web.

9. Product of claim 1 wherein the ethylene/vinyl chloride interpolymer contains from about 20 to about 40 weight percent ethylene, from about 60 to about 80 weight percent vinyl chloride and from about 1.5 to about 4 N-methylol acrylamide.

10. Product of claim 1 wherein the nonwoven fibrous material is a combination of natural fiber and synthetic fiber and the ethylene/vinyl chloride/N-methylol acrylamide terpolymer contains from about 20 to about 40 percent ethylene, from about 60 to about 80 percent vinyl chloride and from 1.5 to about 4 percent N-methylol acrylamide.

11. Product of claim 10 wherein the natural fiber is cellulosic fiber.

12. Product of claim 11 wherein the cellulosic fiber is wood fiber.

13. Product of claim 10 wherein the synthetic fiber is polyamide or polyester.

14. Product of claim 10 wherein the natural fiber is cellulosic fiber and the synthetic fiber is polyamide or polyester.

15. Product of claim 10 wherein the combination of fiber comprises at least 50% by weight of a fiber selected from the group consisting of cellulosic fiber, polyamide fiber, vinyl acetate fiber, fiber of polymers and copolymers of acrylonitrile, poly-(ethylene glycol-terephthalate) fiber and mixtures thereof.

16. Product of claim 1 wherein the terpolymer is present in an amount from about 2 weight percent to about 200 weight percent based on the weight of the fiber.

References Cited
UNITED STATES PATENTS 3,428,582    2/1969    Deex _____ 260—80.73
3,481,908    12/1969    Mortimer _____ 260—80.73

WILLIAM J. VAN BALEN, Primary Examiner

U.S. Cl. X.R.

161—203, 204; 260—80.73